United States Patent
Park et al.

(10) Patent No.: US 6,429,907 B1
(45) Date of Patent: Aug. 6, 2002

(54) LIQUID CRYSTAL DISPLAY HAVING IMPROVED IMAGE QUALITY BY REDUCING THE EXCITED INTERFERENCE VOLTAGE

(75) Inventors: Sung-Il Park, Kyongsangbuk-do; Jae-Young Chung, Pusan, both of (KR)

(73) Assignee: LG Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/496,800

(22) Filed: Feb. 2, 2000

(30) Foreign Application Priority Data

Feb. 24, 1999 (KR) ............................................. 99-6089

(51) Int. Cl.⁷ ............................................ G02F 1/1368
(52) U.S. Cl. .............................. 349/38; 349/43; 349/138
(58) Field of Search ............................... 349/38, 39, 43, 349/122, 138, 139; 257/59, 72; 345/92

(56) References Cited

U.S. PATENT DOCUMENTS 5,659,375 A * 8/1997 Yamashita et al. ............ 349/38
5,852,488 A * 12/1998 Takemura ..................... 349/38
6,226,057 B1 * 5/2001 Lee ............................... 349/38

FOREIGN PATENT DOCUMENTS

JP          07014701      1/1995
KR          9756992       7/1995

* cited by examiner

*Primary Examiner*—William L. Sikes
*Assistant Examiner*—Tai V. Duong
(74) *Attorney, Agent, or Firm*—Birch, Stewart Kolasch & Birch, LLP

(57) ABSTRACT

A liquid crystal display has an increased aperture ratio achieved by an increased area surrounded by the pixel electrode in a pixel area. However, this may result in poor image quality due to the excited interference voltage that is generated by parasitic capacitance created by the overlap of the pixel electrode and the data lines. At different portions of the data lines, the area of overlap between the pixel electrode and the data lines are different. Thus, to eliminate the excited interference voltage and enhance image quality, the thickness of the dielectric member between the pixel electrodes and the data lines is different so that the parasitic capacitance of the parasitic capacitors is about the same.

15 Claims, 2 Drawing Sheets

LIQUID CRYSTAL DISPLAY HAVING IMPROVED IMAGE QUALITY BY REDUCING THE EXCITED INTERFERENCE VOLTAGE

BACKGROUND OF THE INVENTION

1. Field of Invention

The present invention relates to a liquid crystal display which has a high aperture ratio to improve light efficiency and more specifically, the present invention relates to a structure and method for overcoming the deficiencies associated with increasing the aperture ratio by reducing the excited interference voltage.

2. Discussion of Related Art

In a liquid crystal display (LCD), thin film transistors (TFTs) act as switching devices for driving devices of a LCD. Along with pixel electrodes that transmit or reflect light, the TFTs and the pixel electrodes are arranged in matrix of rows and columns. Each of the TFTs and pixel electrodes constitute a basic unit of a LCD.

In an LCD, a plurality of unit pixels consisting of a TFT used as a switching device and a pixel electrode are arranged on a lower substrate and defines an array. An array consisting of unit pixels includes at least one gate line and one data line that cross each other. Gate electrodes of the TFTs are connected to each other and constitute at least one gate line for transferring signals to either a column or row, and source electrodes of the TFTs are connected to each other and constitute at least one data line that carries signals to a row or column.

On an upper substrate, a black matrix is formed such that it corresponds to the array of the lower substrate but without the pixel electrodes. In the black matrix of the upper substrate, common electrodes for applying common voltage and color filters that correspond to the pixel electrodes of the lower substrate are provided. The upper and lower substrates are then bonded together. Next, liquid crystals are injected into the space between the upper and lower substrates.

In forming the black matrix on the upper substrate of the LCD having the above-described structure, misalignment between the TFTs of the lower substrate and the black matrix of the upper substrate may occur when the upper and lower substrates are put together. Thus, a sufficient misalignment margin is required to compensate for the possible misalignment. However, the aperture ratio is decreased when the misalignment margin is introduced.

Accordingly, a method for improving the aperture ratio, by forming a narrow matrix that overlaps the data line with the pixel electrodes with the use of an organic insulating layer having a low dielectric constant has been proposed.

To drive the LCD with the above-described structure, a signal voltage is applied to the gate which turns on a selected TFT. During this time, a data signal with image information passes through the TFT to apply an electric field to the liquid crystals.

However, a part of the voltage applied to the liquid crystals varies because various sources of parasitic capacitance exist in a LCD. Thus, a pixel voltage Vp varies depending on the amount of the excited interference voltage $\Delta V$. The excited interference voltage $\Delta V$ driven by dot inversion is expressed approximately by the following formula. $\Delta V=(C_{d1}*V_{d1}+C_{d2}*V_{d2})/(Cst+C_{LC}+C_{d1}+C_{d2})$, where $C_{d1}$ is parasitic storage capacitance generated from an Nth data line that is overlapped with a pixel electrode, $C_{d2}$ is parasitic storage capacitance generated from a (N+1)th data line that is overlapped with a pixel electrode, $C_{st}$ is storage capacitance of a pixel electrode, $C_{LC}$ is parasitic storage capacitance generated from a transparent electrode of the upper and lower substrates between which liquid crystals are placed, $V_{d1}$ is voltage applied to the Nth data line, and $V_{d2}$ is voltage applied to the (N+1)th data line.

The excited interference voltage $\Delta V$ distorts the voltage applied to the liquid crystals, which cause flickering, crosstalk, and residual image. To fix this, the difference between $C_{d1}$ and $C_{d2}$ should be decreased in order to compensate for the parasitic storage capacitance by reducing the excited interference voltage $\Delta V$ as well as by increasing $C_{st}$.

FIG. 1 is a layout of a LCD according to the related art. Referring to FIG. 1, a gate line 23 and a data line 17 are provided on a substrate 11. The gate line 23 and the data line 17 cross each other, which defines a pixel. A gate electrode 23G is connected to the gate line 23, a source electrode 17S is connected to the data line 17, and a drain electrode 17D is arranged to face with the source electrode 17S.

An active layer 16 on the gate electrode 23G is overlapped with the source and drain electrodes 17S and 17D. The gate electrode 23G, source and drain electrodes 17S and 17D, and active layer 16 constitute a TFT for use as a switching device.

A redundancy layer 15, which should be formed right after the active layer 16 is disposed on the gate electrode 23G, is covered by the data line 17. A pixel electrode 21 is then formed on the whole surface of the pixel area. The pixel electrode 21 is connected to the drain electrode 17D through a contact hole 25. A portion of the gate line 23 that is adjacent to the pixel electrode 21 is overlapped, thus constituting a storage capacitor in the pixel area.

In order to increase the capacitance of a storage capacitor, a subsidiary electrode 27 that is connected electrically to the pixel electrode 17 may be provided between a gate insulating layer and a protecting layer through a second contact hole 29. The subsidiary electrode 27 and the gate line 23 are used as an electrode of the storage capacitor. Thus, the capacitance of the storage capacitor is increased as the gate insulating layer becomes a dielectric layer so that the thickness is reduced.

FIG. 2 shows a cross-section view of the layout in FIG. 1 bisected along the cutting line A—A. Referring to FIG. 2, a redundancy layer 15 and the data line 17 are disposed on a substrate 11 such that a gate insulating layer 13 is provided in between the substrate 11 and the redundancy layers 15 and the data line 17. Note that the data line 17 covers the redundancy layer 15. A protecting layer 19 is then disposed on the gate insulating layer 13 and covers the data line 17. In the above-described case, the protecting layer 19 is made of an organic insulator having a low dielectric constant. A pixel electrode 21 is defined on the protecting layer 19 such that a portion of the protecting layer 19 that corresponds to the redundancy layer 15 is exposed. In the above-described case, the pixel electrode 21 overlaps with the redundancy layer 15 only partially, thus improving the aperture ratio.

The thickness of the portion of the protecting layer 19 under the Nth data line 17 that is overlapped by the pixel electrode 21 is $d_{11}$, while that of the portion of the protecting layer 19 under the (N+1)th data line 17 that is overlapped by the pixel electrode 21 is $d_{12}$. When the protecting layer 19 is made of an organic insulator, the surface of the protecting layer 19 is even because of the excellent flow characteristic of the organic insulator. Therefore, the thickness $d_{11}$ is about the same as the thickness $d_{12}$.

However, the overlapped areas between the pixel electrode and the adjacent data lines differs in area in the LCD. In other words, the overlapped area between the pixel electrode and the data line where the TFT is provided is less than the overlapped area between the pixel electrode and the data line where the TFT is not provided. Thus, the parasitic storage capacitance will vary even if the thickness of the protecting layers under the data lines that are overlapped with the pixel electrode is exactly the same. Therefore, the excited interference voltage ΔV is significant in the LCD and will cause flickering, crosstalk, and residual images because of the different parasitic storage capacitances in the pixel area.

SUMMARY OF THE INVENTION

To overcome the problems described above, preferred embodiments of the present invention provide an LCD that prevents poor image quality due to flickering, crosstalk, residual image, and other similar problems by reducing the excited interference voltage ΔV.

A preferred embodiment of the present invention includes a thin film transistor located at an intersection between a gate line and a data line which are arranged in matrix, a redundancy layer beneath the data line, a protecting layer covering the data line, and a pixel electrode covering a portion of the protecting layer in a pixel area wherein the pixel electrode is overlapped partially with the redundancy layer, and wherein a first and second parasitic capacitor are located at a left and a right side of the overlapped portion of the data line and the pixel electrode with the protecting layer defining a dielectric layer, wherein the second parasitic capacitor occupies a larger area than the first parasitic capacitor, wherein a portion of the protecting layer of the first parasitic capacitor is thicker than the other portion of the protecting layer of the second parasitic capacitor, and wherein storage capacitance of the first parasitic capacitor is substantially equal to that of the second parasitic capacitor.

Other features, elements and advantages of the present invention will be described in detail below with reference to preferred embodiments of the present invention and the attached drawings.

BRIEF DESCRIPTION OF THE ATTACHED DRAWINGS

The present invention will become more fully understood from the detailed description given herein below and the accompanying drawings which are given by way of illustration only, and thus do not limit the present invention and wherein.

DETAILED DESCRIPTION OF PREFERRED EMBODIMENTS

Figure 1:
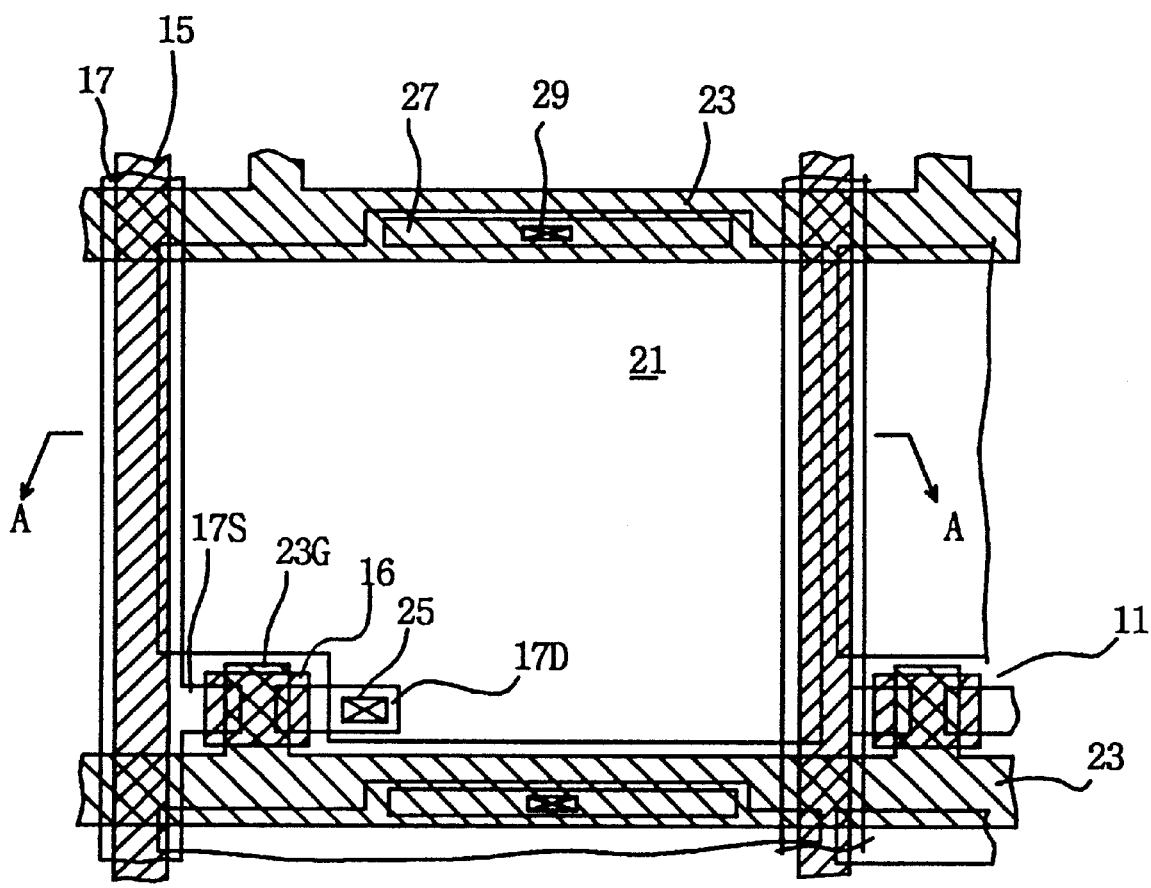
FIG. 1 is a layout of a LCD according to the related art.
Figure 2:
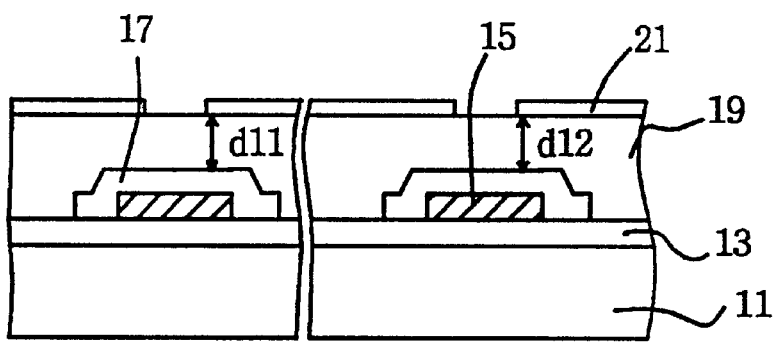
FIG. 2 is a cross-section view of the layout as shown in FIG. 1 bi-sected along the line A—A.
Figure 3:
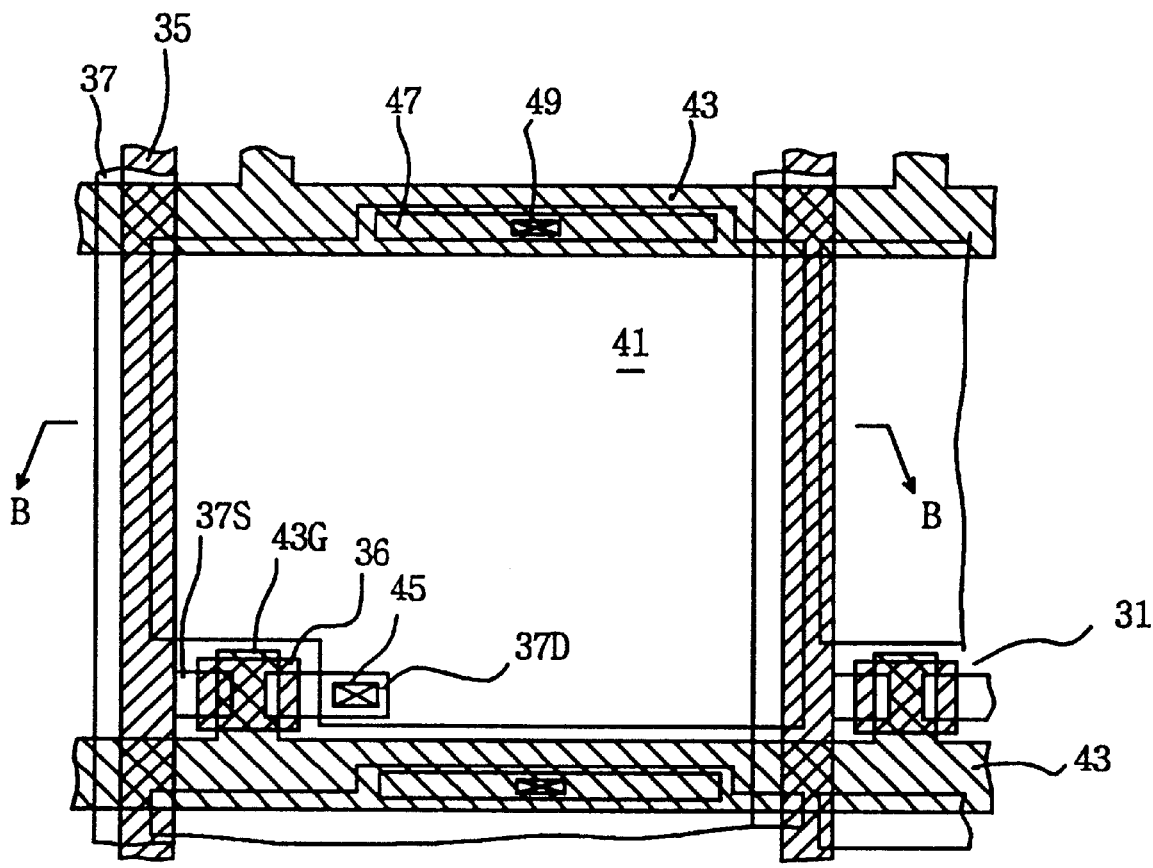
FIG. 3 is a layout of an LCD according to a preferred embodiment of the present invention.

FIG. 3 is a layout of a LCD according to a preferred embodiment of the present invention. Referring to FIG. 3, a gate line 43 and a data line 37 are provided on a substrate 31. The gate line 43 and the data line 37 cross each other so as to define a pixel. A gate electrode 43G is connected to the gate line 43, a source electrode 37S is connected to the data line 37, and a drain electrode 37D is arranged to face the source electrode 37S.

An active layer 36 disposed on the gate electrode 43G overlaps the source electrode 37S and the drain electrode 37D. The gate electrode 43G, the source electrode 37S and the drain electrode 37D, and the active layer 36 constitute a TFT that is used as a switching device.

A redundancy layer 35 is provided beneath the data line 37. The redundancy layer 35 should be formed as soon as the active layer 36 is disposed on the gate electrode 43G so that the data line 37 does not become open electrically because of the step difference. Note that the redundancy layer 35 is covered by the right portion of the data line 37 in the present preferred embodiment. Also, the edge of the redundancy layer 35 adjacent to the source electrode 37S coincides with the edge of the Nth data line 37 while the edge of the redundancy layer 35 away from the TFT is covered with the (N+1)th data line 37.

A pixel electrode 41 is arranged on the whole surface of the pixel area. The pixel electrode 41 is connected to the adjacent drain electrode 37D through a first contact hole 45. A portion of the gate line 43 that is adjacent to the pixel electrode 41 is overlapped to define a storage capacitor in the pixel area. In the storage capacitor, the pixel electrode 41 and the gate line 43 are used as a storage and plate electrode, respectively. A gate insulating layer 33 and a protecting layer 39 as shown in FIG. 4 are used as the dielectric layer.

In order to increase the capacitance of the storage capacitor, a subsidiary electrode 47 that is connected electrically to the pixel electrode 41 may be disposed between the gate insulating layer 33 and the protecting layer 39 through a second contact hole 49. The subsidiary electrode 47 as well as the gate line 43 is used as an electrode of the storage capacitor. Thus, the capacitance of the storage capacitor is increased with the gate insulating layer 33 defining a dielectric layer so that the thickness is reduced.

Figure 4:
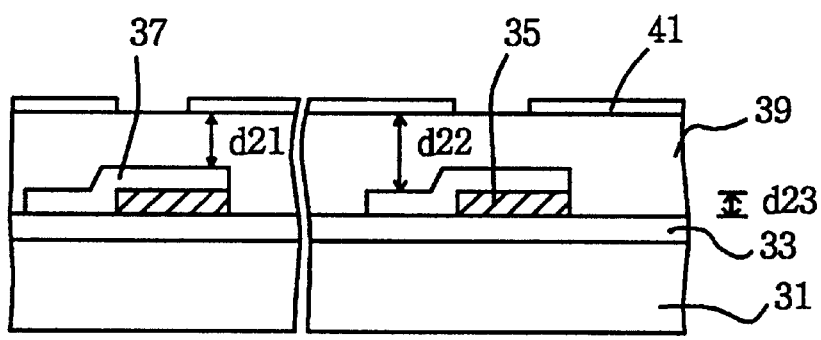
FIG. 4 is a cross-section view of the layout as shown in FIG. 3 bi-sected along the line B—B.

FIG. 4 is a cross-section view of the layout as shown in FIG. 3 bi-sected along the line B—B. Referring to FIG. 4, a redundancy layer 35 and data line 37 are provided on a substrate 31 such that a gate insulating layer 33 is inserted in between the substrate 31 and the redundancy layer 35 and data line 37. Note that a portion of the data line 37 covers most of the redundancy layer 35. More specifically, an edge of the redundancy layer 35 is covered by an edge of the Nth data line 37 while the other edge of the redundancy layer 35 is covered by the (N+1)th data line 37.

A protective layer 39 is disposed on the gate insulating layer 33 and covers the data line 37. The protective layer 39 is preferably made of an organic insulator that has a low dielectric constant such as acryl, teflon, cytop, polyarylether fluoride, fluorinated polyamide, BCB (benzocyclobuten), and other similar materials. A flat surface in the protective layer 39 exists if the protective layer is made of one of the above-mentioned organic insulators, which has excellent flow characteristics.

A pixel electrode 41 is defined on the protective layer 39 such that a portion of the protective layer 39 that covers the redundancy layer 35 is exposed. In preferred embodiments, the pixel electrode 41 overlaps with the redundancy layer 35 only partially at the first data line but does not overlap with the redundancy layer at the second data line.

Parasitic capacitors, which have the protecting layer 39 as the dielectric layers thereof, have a storage capacitance $C_1$, and $C_2$, and are located where the data line 37 and the pixel electrode 41 are overlapped. The area $A_1$ of the parasitic capacitor that is overlapped with the Nth data line 37 is less than the area $A_2$ of the parasitic capacitor that is overlapped with the (N+1)th data line. Note that the thickness of the portion of the protective layer 39 under the Nth data line 37 that is overlapped with the pixel electrode 41 is $d_{21}$, while the thickness of the portion of the protective layer 39 under the (N+1)th data line 37 that is overlapped with the pixel electrode 41 is $d_{22}$. If the protecting layer 39 is made of an organic insulator, the surface of the protecting layer 39 is flat because of the excellent flow characteristics of the organic insulator. Concerning the protective layer 39, note that the thickness $d_{22}$ is preferably thicker than $d_{21}$ approximately in the amount of the thickness $d_{23}$ of the redundancy layer 35.

Therefore, the respective capacitance of the parasitic capacitors are $C_1 = \in A_1/d_{21}$ and $C_2 = \in A_2/d_{22}$. Note that in the parasitic capacitors, the area A1 is greater than the area $A_2$ but the thickness $d_{21}$ is less than that $d_{22}$. Thus, the parasitic capacitance $C_1$ is about equal to $C_2$.

When the driving voltage is 5V, the approximate value of the excited interference voltage $\Delta V$ of LCD driven by dot inversion is equal to $(C_1 - C_2)/(C_{st} + C_{LC} + C_{d1} + C_{d2})$. As seen from the above equation, the excited interference voltage $\Delta V$ is 0 when $C_1 = C_2$. Accordingly, the poor image quality due to flickering, crosstalk, and residual image is eliminated by reducing the excited interference voltage $\Delta V$.

To recap, preferred embodiments of the present invention virtually eliminates the difference in the parasitic storage capacitance that exists in the Nth and (N+1)th data line by varying the thickness of the protective layer that is used as the dielectric. Accordingly, the present invention greatly improves the image quality by eliminating flickering, crosstalk, and residual image that caused by the excited interference voltage $\Delta V$.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display comprising:

a substrate;

a plurality of gate lines on the substrate;

a plurality of data lines on the substrate such that the data lines are arranged as a matrix with the plurality of gate lines to define a plurality of pixel areas, wherein a pixel area includes a first data line arranged substantially parallel with a second data line and a first gate line arranged substantially parallel with a second gate line such that the first gate line intersects a first end of the first and second data lines and the second gate line intersects a second end of the first and second data lines;

at least one thin film transistor such that at least one thin film transistor is defined substantially at an intersection between one of the gate lines and one of the data lines within the pixel area;

an intermediate layer beneath a portion of the data lines;

a protective layer covering the data lines; and a pixel electrode overlapped with the data lines and covering a portion of the protective layer in the pixel area, wherein the pixel electrode is overlapped partially with the first data line such that the pixel electrode is overlapped partially with the intermediate layer that is beneath the first data line and the pixel electrode is overlapped partially with the second data line such that the pixel electrode is not substantially overlapped with the intermediate layer that is beneath the second data line, wherein a first parasitic capacitor is defined by an area of overlap between the first data line and the pixel electrode and a second parasitic capacitor is defined by an area of overlap between the second data line and the pixel electrode such that the second parasitic capacitor has a larger overlap area than the overlap area of the first parasitic capacitor, wherein the protective layer that is between the pixel electrode and the first and second data lines defines a dielectric layer of the first and second parasitic capacitors, wherein a thickness of the dielectric layer that is between the pixel electrode and the second data line of the second parasitic capacitor is greater than a thickness between the pixel electrode and the first data line of the first parasitic capacitor, and wherein the capacitance of the first parasitic capacitor is substantially equal to that of the second parasitic capacitor.

2. The liquid crystal display according to claim 1, wherein the intermediate layer is beneath a right portion of the data lines such that a left portion of the data lines is contacts a gate insulating layer that is disposed between the substrate and the intermediate layer.

3. The liquid crystal display according to claim 1, wherein the pixel electrode is overlapped partially with the intermediate layer that is covered by the first data line at a right edge of the intermediate layer and the pixel electrode is overlapped with the second data line at a left edge of the second data line.

4. The liquid crystal display according to claim 1, wherein the protective layer is made of an organic insulator having a low a dielectric constant including at least one of acryl, teflon, cytop, polyarylether fluoride, fluorinated polyamide, benzocyclobuten.

5. The liquid crystal display according to claim 1, wherein the pixel electrode overlaps the first data line at a right edge of the first data line, and wherein the pixel electrode overlaps the second data line at a left edge of the second data line.

6. The liquid crystal display according to claim 1, wherein a distance between the pixel electrode and the second data line of the second parasitic capacitor is greater than a distance between the pixel electrode and the first data line of the first parasitic capacitor by about the amount of thickness of the intermediate layer.

7. The liquid crystal display according to claim 6, wherein the distance between the pixel electrode and a left edge of the second data line is greater than the distance between the pixel electrode and a right edge of the first data line by about the amount of thickness of the intermediate layer.

8. A liquid crystal display comprising:

a substrate;

a plurality of gate lines on the substrate;

a plurality of data lines on the substrate such that the data lines are arranged as a matrix with the plurality of gate lines to define a plurality of pixel areas, wherein a pixel area includes a first data line arranged substantially parallel with a second data line and a first gate line arranged substantially parallel with a second gate line such that the first gate line intersects a first end of the first and second data lines and the second gate line intersects a second end of the first and second data lines;

a thin film transistor such that the thin film transistor is defined substantially at an intersection between one of the gate lines and one of the data lines within the pixel area;

an intermediate layer beneath the data lines;

a protective layer covering the data lines; and a pixel electrode covering a portion of the protective layer in the pixel area and overlapped with the data lines, wherein the pixel electrode is overlapped partially with the intermediate layer that is beneath the first data line and the pixel electrode is overlapped partially with the second data line, wherein a first parasitic capacitor is defined by an area of overlap between the first data line and a pixel electrode and a second parasitic capacitor is defined by an area of overlap between the second data line and a pixel electrode, wherein the second parasitic capacitor has a larger overlap area than the overlap area of the first parasitic capacitor, wherein a distance between the pixel electrode and the second data line of the second parasitic capacitor is greater than a distance between the pixel electrode and the first data line of the first parasitic capacitor, and wherein the capacitance of the first parasitic capacitor is substantially equal to that of the second parasitic capacitor.

9. The liquid crystal display according to claim 8, wherein the protective layer that is between the overlap area of the pixel electrode and the first and second data lines defines a dielectric layer of the first and second parasitic capacitors.

10. The liquid crystal display according to claim 9, wherein a thickness of the dielectric layer of the second parasitic capacitor is greater than a thickness of the dielectric layer of the first parasitic capacitor.

11. The liquid crystal display according to claim 8, wherein the intermediate layer is beneath a right portion of the data lines such that a left portion of the data lines contacts a gate insulating layer that is disposed between the substrate and the intermediate layer.

12. The liquid crystal display according to claim 8, wherein the pixel electrode is overlapped partially with the intermediate layer that is covered by the first data line at a right edge of the intermediate layer and the pixel electrode is overlapped with the second data line at the left edge of the second data line.

13. The liquid crystal display according to claim 8, wherein the protective layer is made of an organic insulator having a low a dielectric constant including at least one of acryl, teflon, cytop, polyarylether fluoride, fluorinated polyamide, benzocyclobuten.

14. The liquid crystal display according to claim 8, wherein the distance between the pixel electrode and the second data line of the second parasitic capacitor is greater than the distance between the pixel electrode and the first data line of the first parasitic capacitor by about the amount of thickness of the intermediate layer.

15. The liquid crystal display according to claim 15, wherein the distance between the pixel electrode and a left edge of the second data line is greater than the distance between the pixel electrode and a right edge of the first data line by about the amount of thickness of the intermediate layer.

* * * * *